Oct. 3, 1967  S. A. SCHNEIDERMAN  3,345,080
WHEELED SLED WITH HAND BRAKE
Filed March 24, 1966
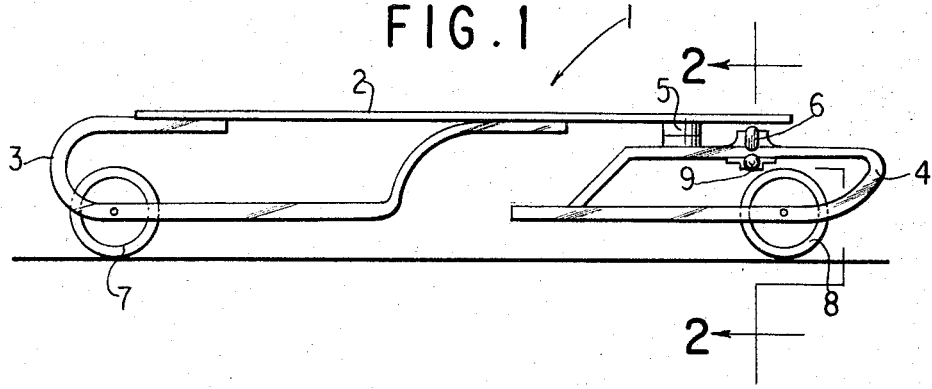
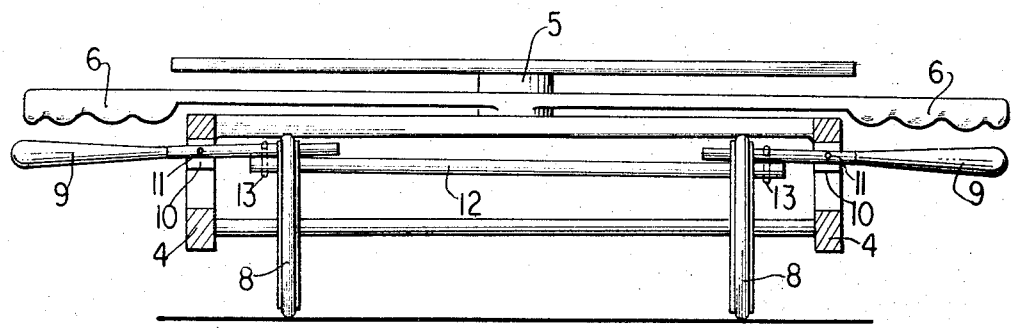
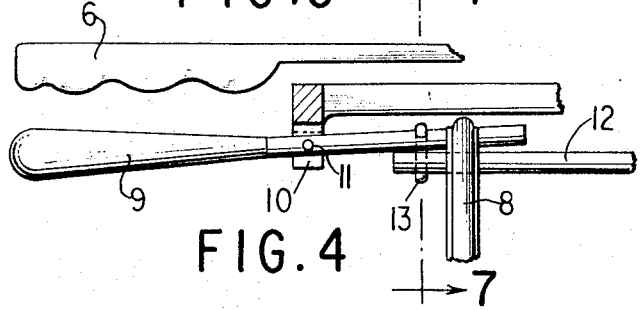
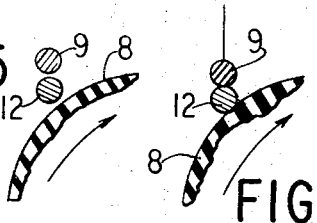
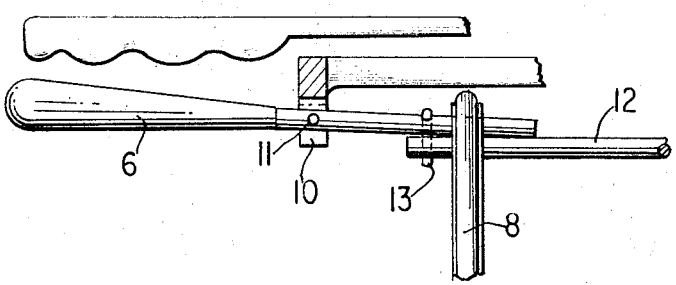
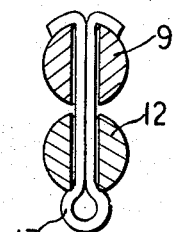
INVENTOR
SEYMOUR A. SCHNEIDERMAN
BY Hammond and Littell
ATTORNEYS

United States Patent Office

3,345,080
Patented Oct. 3, 1967

3,345,080
WHEELED SLED WITH HAND BRAKE
Seymour A. Schneiderman, 195–03 50 Ave., Flushing, N.Y. 11365
Filed Mar. 24, 1966, Ser. No. 537,136
1 Claim. (Cl. 280—8)

ABSTRACT OF THE DISCLOSURE

A wheeled dual purpose steerable sled comprising a simplified hand brake mechanism which acts upon the front wheels and may be operated by a rider without removing his hands from the steering device.

---

This invention relates to a dual purpose sled. More particularly, the invention relates to a steerable wheeled sled having a hand brake.

Sleds having mounted thereon removable wheels are well known. Examples of such sleds may be found in U.S. Patents Nos. 2,885,214; 2,914,334 and 3,104,115. Such sleds serve a dual purpose, thereby overcoming the obvious seasonal utility of single purpose sleds which are merely adapted for use on snow. Generally, single-purpose sleds are used in areas far removed from where automobiles may present a hazard. However, a sled equipped with wheels invites use in almost any type of environment. Consequently, a severe safety hazard exists when a dual-purpose sled is equipped with wheels.

Accordingly, it is an object of this invention to provide a safety brake for wheeled sleds.

Another object of this invention is to provide a safety brake for a steerable wheeled sled.

A further object of this invention is to provide a hand operated safety brake for a steerable wheeled sled.

Another object of this invention is to provide a hand operated safety brake for a steerable wheeled sled, which brake is situated on the forward portion of said sled.

Another object of this invention is to provide a hand operated safety brake for a steerable wheeled sled, which brake is situated on the forward portion of said sled for easy operation by a rider in prone position on said sled without removing his hands from the steering handles.

A further object of this invention is to provide a hand operated safety brake for a steerable wheeled sled, which brake is engageable with the two forward wheels by means of a simple and inexpensive connection.

These and other objects and advantages will become apparent as the description thereof proceeds.

The aforementioned objects may be obtained by a dual purpose sled comprising: a platform for mounting a rider; runners connected to said platform; removable wheels connected to said runners; hand steering means operable with and connected to said runners, said hand steering means mounted at the forward end of said platform so that said sled may be steered by a rider in a prone position on said platform; hand brake means engageable with the forward wheels of said sled and mounted at the forward end of said platform so that said sled may be braked by a rider in a prone position on said platform.

The invention will be more fully understood by reference to the drawing wherein like reference numerals indicate corresponding parts and in which, FIG. 1 is a full sideview showing a steerable wheeled sled and the relationship of the steering mechanism to the braking handles;

FIG. 2 is a front view along the line 2—2, partly in section, showing the steering handles, brake handles, brake, front wheels and axle;

FIG. 3 is a partial front view of FIG. 2, before the brake is applied;

FIG. 4 is a partial front view of FIG. 2 after the brake is applied;

FIG. 5 is a diagrammatic representation showing a wheel and braking mechanism before the brake is applied;

FIG. 6 is a diagrammatic representation showing a wheel and the braking mechanism after the brake is applied;

FIG. 7 shows a section through 7—7 of FIG. 3.

Referring to FIG. 1 there is shown a steerable wheeled sled, indicated broadly as 1. The sled 1, has a platform 2, upon which a person may sit or lie in a prone position. Platform 2, is supported by rear runners 3 and forward runners 4. Forward runners 4 are pivotably connected to platform 2, by pivot 5 and steerable therefrom by means of steering handle 6. Connected to the runners are rear wheels 7 and front wheels 8. Wheels 7 and 8 are removably mounted on the runners and this invention contemplates their mounting and removal in any manner. Situated just below steering handle 6 is brake handle 9, the details of which are explained more fully hereinafter.

Referring to FIG. 2, there is shown a full front view of the steerable wheeled sled. The brake handle 9, is situated just below the steering handle 6. The distance between steering handle 6 and brake handle 9 may vary, but should lie within such limits that a rider may grasp both the steering handle 6 and when necessary, and without losing control of the steering handle, also grasp brake handle 9, with the same hand. The distance between handles 6 and 9 may vary. For example, said distance may be about 1 inch, but in any event should be such that a child would be able to grasp both the steering handles and the brake handles in one hand. Brake handle 9 is pivotally connected in housing 10 by a pin 11 and is connected to a transverse bar 12 by means of a loosely fitting cotter pin 13. Transverse bar 12, as shown in FIG. 2, lies above and behind front wheels 8.

When the brake handle 9 is pulled upward towards the steering handle 6, brake handle 9 is pivoted in housing 10 and pin 13 guides the brake handle 9 into contact with transverse bar 12, thereby causing bar 12 to frictionally engage front wheels 8 and brake the sled. In place of pin 13, any equivalent means may be utilized to guide the brake handles into contact with transverse bar 12. For example, transverse bar 12 may be provided with a ring through which brake handle 9 may pass. With such an arrangement the ring would serve to guide the brake handles into contact with bar 12.

FIGS. 3 and 5 show brake handle 9, transverse bar 12, and front wheel 8, before the brake is engaged, FIG. 5 being a diagrammatic representation.

FIGS. 4 and 6 show brake handle 9, transverse bar 12 and front wheel 8, after the brake is engaged, FIG. 6 being a diagrammatic representation.

The invention has been described with specific reference to a steerable sled having separate front and rear runners. The brake may, however, be used in combination with any sled having steering handles on the forward portion thereof. Furthermore, the braking mechanism may be constructed of any suitable high strength material such as cast iron, aluminum or plastic.

As is readily apparent, the brake as described herein is simple in structure and hence capable of manufacture economically. Furthermore, with particular reference to the propensities of small children, the brake will not become damaged or broken while in ordinary service. The simple structure of the brake is of advantage as it enables a child, having limited strength, to brake the sled with relatively slight pressure.

While preferred modes of practice of the invention have been set forth it will be understood that this is solely for the purpose of illustration and that various changes and modifications may be made without departing from the spirit of the disclosure and the scope of the appended claim.

I claim:

In a dual purpose wheeled sled comprising a platform for mounting a rider, runners connected to said platform, removable front and rear wheels connected to said runners between said runners, and hand steering means operable with and connected to said runners, said hand steering means mounted at the forward end of said platform and outside the runner base of said sled so that said sled may be steered by a rider in a prone position on said platform, an improved hand brake mechanism engageable with the front wheels of said sled and mounted at the forward end of said platform so that said sled may be braked by a rider in prone position on said platform, said hand brake mechanism including handles mounted below said steering means at a distance from said hand steering means such that a rider in prone position on said platform may engage said handles without removing his hands from said hand steering means, a transverse bar running parallel to an axis passing through the center of the front wheels, said transverse bar being in direct contact with said front wheels when said hand brake means is engaged and out of contact above said front wheels when said hand brake means is disengaged, said handles being pivotably connected to said sled in parallel overlapping relationship to said transverse bar at a point outside the wheel base of said front wheels so that movement of said handles in an upward direction causes engagement of said transverse bar with said front wheels, and means connecting said handles with said transverse bar to guide said handles into contact with said transverse bar.

References Cited

UNITED STATES PATENTS

| | | | |
|---|---|---|---|
| 1,501,589 | 7/1924 | Ferris | 188—2 |
| 1,656,472 | 1/1928 | Christofferson | 188—26 |
| 1,720,488 | 7/1929 | Lier | 188—2 |
| 2,647,759 | 8/1953 | Moffitt | 280—8 |
| 3,117,653 | 1/1964 | Altherr | 188—29 |
| 3,219,357 | 11/1965 | Cheatham | 280—8 |

BENJAMIN HERSH, *Primary Examiner.*

L. D. MORRIS, *Examiner.*